(12) United States Patent
Wang

(10) Patent No.: US 7,701,827 B2
(45) Date of Patent: Apr. 20, 2010

(54) RECORDER AND METHOD FOR DETERMINING RECORDING SIGNAL

(75) Inventor: Chun-Chieh Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 473 days.

(21) Appl. No.: 11/773,974

(22) Filed: Jul. 6, 2007

(65) Prior Publication Data
US 2008/0130472 A1     Jun. 5, 2008

(30) Foreign Application Priority Data
Dec. 5, 2006     (CN)     ........................ 2006 1 0201212

(51) Int. Cl.
*G11B 7/0045* (2006.01)
(52) U.S. Cl. ..................... 369/59.11; 369/116
(58) Field of Classification Search ........................ None
See application file for complete search history.

(56) References Cited

U.S. PATENT DOCUMENTS

| 6,339,579 | B1 | 1/2002 | Kamioka et al. |
| 7,196,996 | B2 | 3/2007 | Matsuda |
| 7,215,617 | B2 | 5/2007 | Ando et al. |
| 2004/0017751 | A1* | 1/2004 | Matsumoto ............... 369/47.53 |
| 2005/0030863 | A1* | 2/2005 | Masui ..................... 369/47.53 |

\* cited by examiner

*Primary Examiner*—Peter Vincent Agustin
*Assistant Examiner*—Emily Frank
(74) *Attorney, Agent, or Firm*—Frank R. Niranjan

(57) ABSTRACT

A method for determining a recording signal of a recorder to record data onto a disc, the recording signal comprising a top pulse having a first power value Ph includes steps of: generating first test power values based on an initial first power value to record test data onto the disc; detecting concentricity parameters PS corresponding to the first test power values; quadratic curve fitting the concentricity parameters PS and the first test power values; determining an optimum value of the first power value Ph.

20 Claims, 13 Drawing Sheets

| Parameters \ Recording Speed | 2x | 4x | 6x | 8x |
|---|---|---|---|---|
| Duty | 3.1T | 3.1T | 3.2T | 3.2T |
| Ph | 15 mW | 22mW | 25mW | 31mW |
| Pm/Ph | 2/3 | 2/3 | 2/3 | 2/3 |

RECORDER AND METHOD FOR DETERMINING RECORDING SIGNAL

BACKGROUND OF THE INVENTION

1. Field of the Invention

This invention relates to a recorder and a method for determining a recording signal of the recorder.

2. Description of Related Art

Optical recorders for recording data onto recordable optical discs are widely used. Recordable discs, such as DVD-R/RW, DVD+R/RW, and CD-R/RW, are popular optical storage media in the consumer electronics market.

A typical recorder uses a laser beam to record the data onto the disc. The laser beam is controlled by a recording signal of the recorder. The power level of the recording signal determines the optical power of the laser beam. If the optical power of the laser beam is not strong enough, the data recorded on the disc by the laser beam may not be readable.

Generally, the recording signal of the recorder to record the data onto the disc are predetermined by a disc manufacturer or the recorder manufacturer. For example, a recorder identifies a disc loaded in the recorder by reading a media ID (MID) embedded in the disc; thus optimized parameters for determining the recording signal stored in the recorder is selected according to the MID.

However, the optimized recording parameters for the recording signal may not be appropriate to record different discs; even if the discs have a same MID. For example, a first batch of the discs may have data written on them soon after being manufactured, while a second batch of the discs may have data written on them after an extended period of time and may have being subjected to different environmental conditions. The recording properties of these two batches of discs may change due to such conditions as temperature and humidity.

Therefore, a method and an apparatus for determining the recording signal are desired.

SUMMARY OF THE INVENTION

A method for determining a recording signal of a recorder to record data onto a disc, the recording signal comprising a top pulse having a first power value Ph includes steps of: generating first test power values based on an initial first power value to record test data onto the disc; detecting concentricity parameters PS corresponding to the first test power values; quadratic curve fitting the concentricity parameters PS and the first test power values; determining an optimum value of the first power value Ph.

A recorder includes a controlling device for adjusting a recording signal for controlling a laser beam. The controlling device includes a storage module, a PS detect unit, a quadratic curve fitting unit, and a power value calculator. The storage module is used for storing power values and test data. The PS detect unit is used for detecting concentricity parameters PS of the test data. The quadratic curve fitting unit is used for quadratic curve fitting the concentricity parameters PS and the first test power values Ph. The power value calculator is used for calculating an optimum value of the first power value Ph.

Other advantages and novel features will become more apparent from the following detailed description of preferred embodiments when taken in conjunction with the accompanying drawings.

BRIEF DESCRIPTION OF THE DRAWINGS

Many aspects of the apparatus and method can be better understood with reference to the following drawings. The components in the drawings are not necessarily to scale, the emphasis instead being placed upon clearly illustrating the principles of the present apparatus and method. Moreover, in the drawings, like reference numerals designate corresponding parts throughout the several views.

FIG. 5 is a table illustrating initial values of segment, Ph, and Pm/Ph at different recording speeds;

DETAILED DESCRIPTION OF THE INVENTION

Reference will now be made to the drawings to describe, in detail, a preferred embodiment of a present recorder and a method for determining a recording signal.

Figure 1:
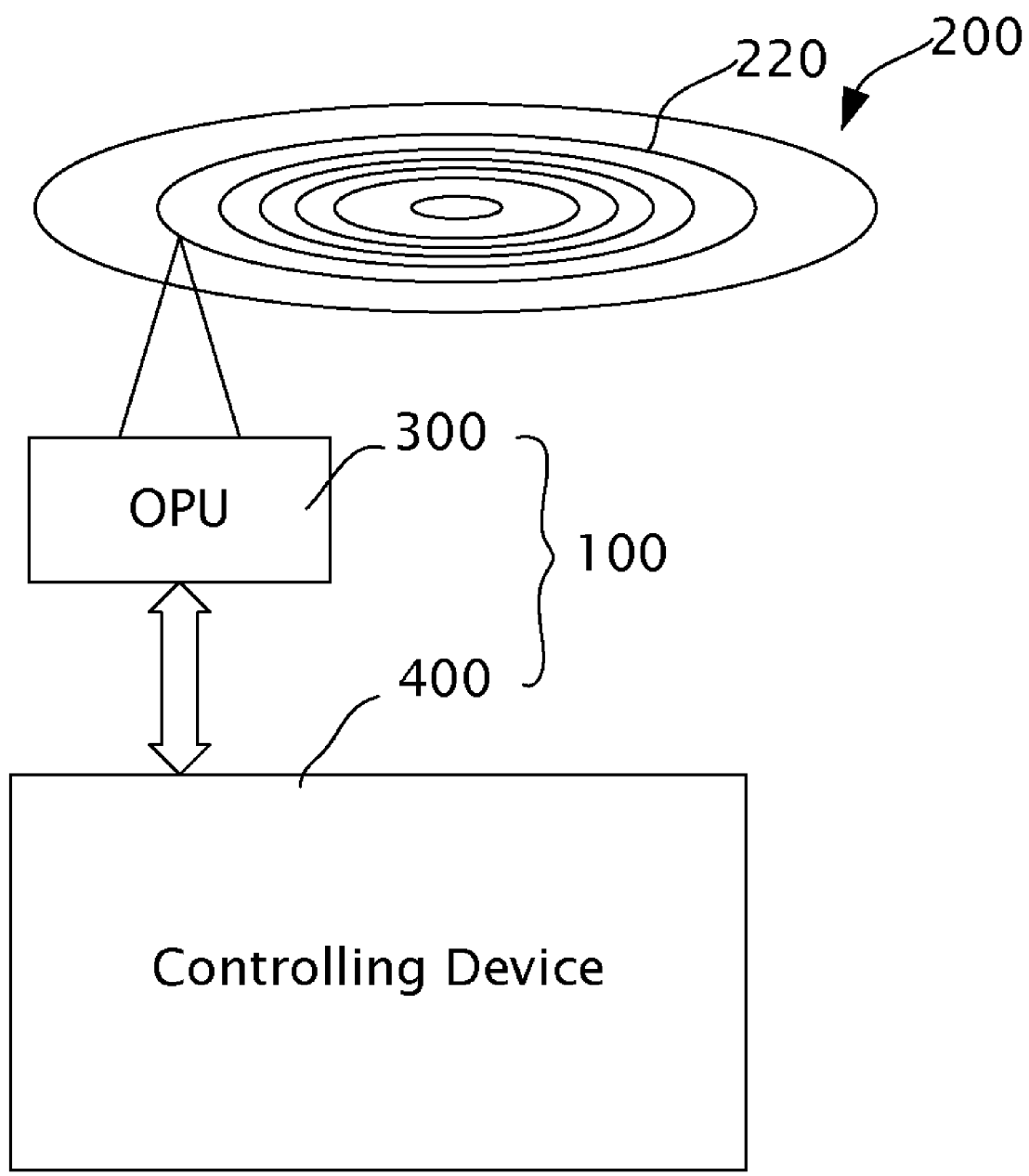
FIG. 1 is a block diagram of a recorder in accordance with an exemplary embodiment, the recorder including a controlling device.

Referring to FIG. 1, a recorder 100 used for recording data onto a disc 200 is depicted. The recorder 100 includes an optical pickup unit (OPU) 300 for emitting a laser beam on the disc 200 so as to record the data onto the disc 200, and a controlling device 400 for adjusting the optical power of the laser beam. Generally, the disc 200 includes concentric tracks 220 expanding from a center to a periphery of the disc 200.

Figure 2:
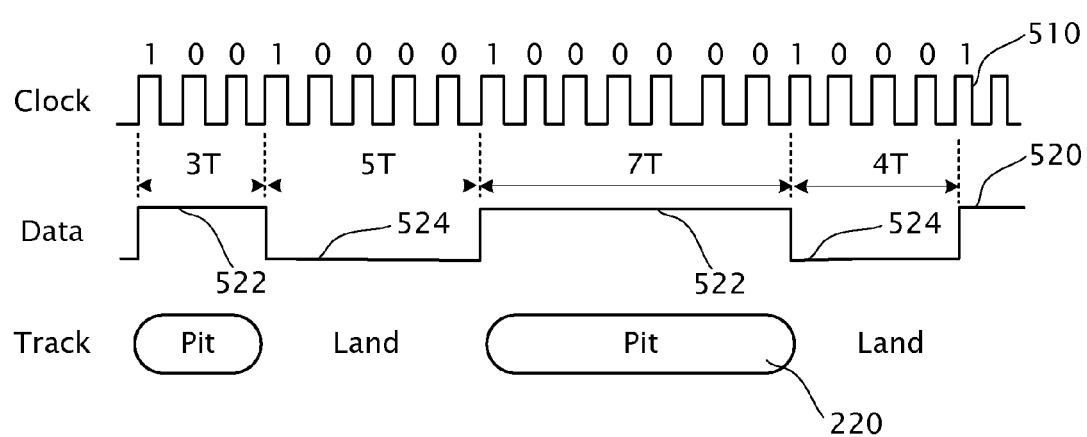
FIG. 2 is a waveform chart showing a clock signal, a data signal, and a track.

FIG. 2 shows relationships among a clock signal 510, a data signal 520, and a track 220. The track 220 includes pits and lands. The pits are shallow depressions on the disc 200, usually as deep as ¼ of the laser beam's wavelength. The pits are designed to cause cancellation of the laser beam, that is, the pits are not reflective. The lands between the pits are reflective, meaning that the laser beam is reflected, off of the surface of the land, to the OPU 300. A transition either from a pit to a land or from the land to the pit represents a logical '1', while the absence of the transition represents a logical '0'. The data signal 520 includes an nT width mark period 522 (n=3~11, 14) and an nT width space period 524 (n=3~11, 14), wherein "T" represents a period of time for recording one binary bit on the disc 200 and "n" represents the number of Ts. The mark period 522 is configured for generating the pits on the track 220 and the space period is configured for generating the lands on the track 220.

Generally, a CD compatible medium employs an EFM (Eight to Fourteen Modulation) scheme. With EFM, every 8 bits of data are converted into 14-bits codes. In the 14-bits codes, '0' is used to denote the land or the pit, and '1' is used to signal the transition from the land to the pit or the pit to the land. There are always at least three and no more than eleven '0's between every adjacent transition. Within an EFM lookup table, it is possible for the 14-bits codes to start or end with a '1'. In order to avoid a first group of 14-bits code ending with a "1" and a following group of 14 bits code beginning with a '1', three merging bits of three '0's are added between all the adjacent 14-bits codes. Thus, EFM can be considered as an eight-to-seventeen modulation scheme. Thus, a longest pit length or a longest land length is 14T. EFMPlus is an equivalent encoding method employed by DVD formats. EFMPlus works in a same way for DVD as EFM works for CD, except that the 8-bit source codes are converted to 16-bit codes. An EFMPlus lookup table is constructed in such a way that merging bits are not required between the start and end bits of adjacent codes.

Figure 3:
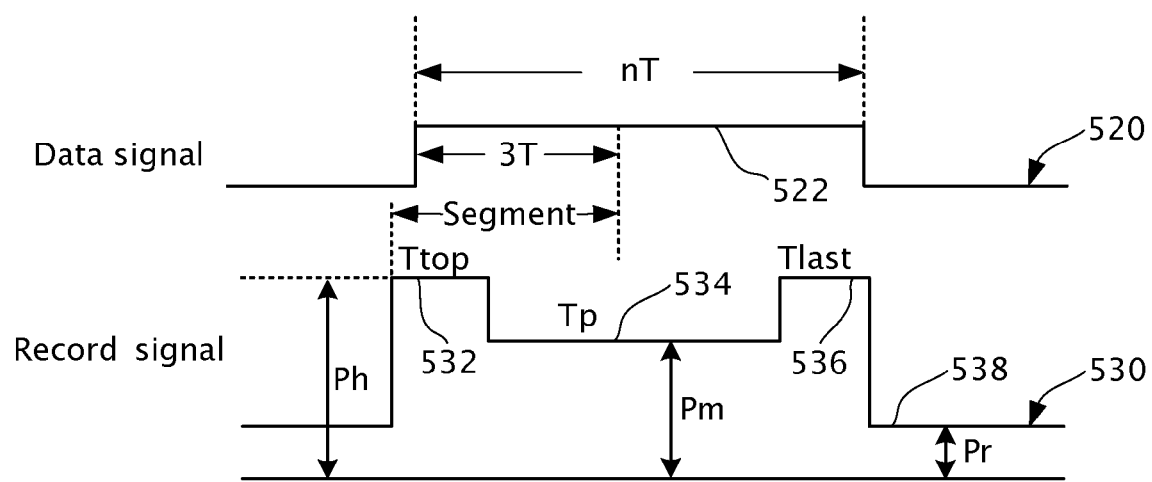
FIG. 3 is a waveform chart showing the data signal and a recording signal.

FIG. 3 shows a relation between the data signal 520 and a recording signal 530. The recording signal 530 includes a top pulse 532, a middle pulse 534, a last pulse 536, and a low level portion 538. A power value of the top pulse 532 is denoted as Ph. A power value of the middle pulse 534 is denoted as Pm. Generally, a power value of the last pulse 536 is equal to Ph and a power value of the low level portion 538 is equal to a read power level Pr. A segment is defined to describe a time interval between a rising edge of the top pulse 532 to a 3T point of the mark period 522.

Figure 4:
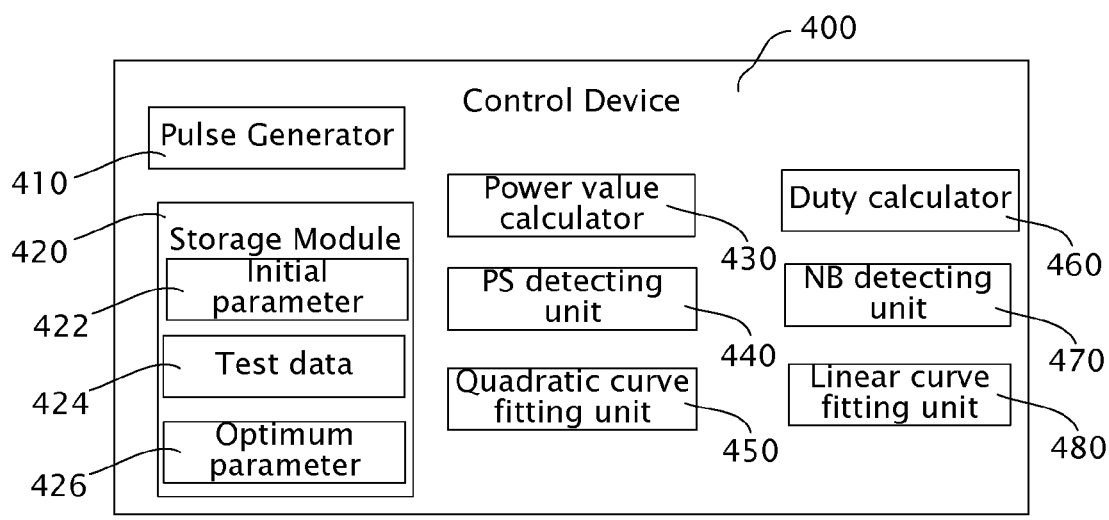
FIG. 4 is a detailed block diagram of the controlling device of FIG. 1.

Referring to FIG. 4, the controlling device 400 includes a pulse generator 410, a storage module 420, a power value calculator 430, a PS detecting unit 440, a quadratic curve fitting unit 450, a segment calculator 460, a NB detecting unit 470, and a linear curve fitting unit 480. The pulse generator 410 is used for generating the recording signal 530 based on recording parameters stored in the storage module 420. The storage module 420 includes an initial parameter unit 422, a test data unit 424, and an optimum parameter unit 426.

The initial parameter unit 422 is used for storing initial values of the segment, the Ph, and the Pm/Ph. Referring also to FIG. 5, the initial values of the segment, the Ph, and the Pm/Ph are listed correspondingly according to different recording speeds. A recording speed is used for denoting an amount of data recorded onto the disc 200 per second, and is usually measured in mega bytes per second (MB/s). For example, a single DVD recording speed (1×) is 1.32 MB/s. The initial values of the segment, the Ph, and the Pm/Ph are derived by performing initial testing.

Figure 6:
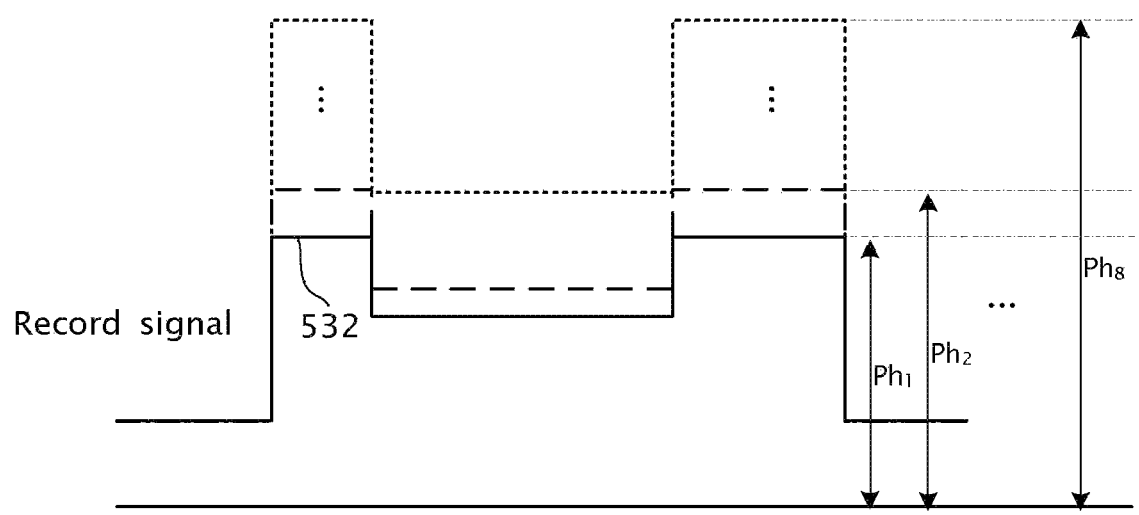
FIG. 6 is a schematic diagram illustrating adjustments of first test power values of the record pulse.

The power value calculator 430 is used for calculating power values of the Ph, Pm and Pm/Ph. Referring also to FIG. 6, eight different first test power values Ph1~Ph8 of the top pulse 532 are calculated by the power value calculator 430 based on an initial power value of Ph stored in the initial parameter unit 422. For example, when the disc 200 is to be recorded at 4× recording speed, the initial power value of Ph corresponding to the 4× recording speed would be 22 mW according to FIG. 5. The first test power values Ph1~Ph8 calculated by the power value calculator 430 may be, for example, 16 mW, 18 mW, 20 mW, 22 mW, 23 mW, 24 mW, 26 mW, and 28 mW.

The test data unit 424 is constructed and arranged for storing test data. The recorder 100 records the test data onto the disc 200 employing the first test power values Ph1~Ph8. The value of Pm/Ph is equal to the initial value of Pm/Ph illustrated in FIG. 5, for example ⅔, when the test data is recorded. In order to decrease interference of the 3T pits or lands from the 4T or 5T pits or lands, the test data do not include 4T or 5T mark or space periods. Therefore, there are not any 3T pits or lands spread from 4T or 5T mark or space periods. That is, the test data includes 3T, 6T~11T, 14T mark or space periods.

Figure 7:
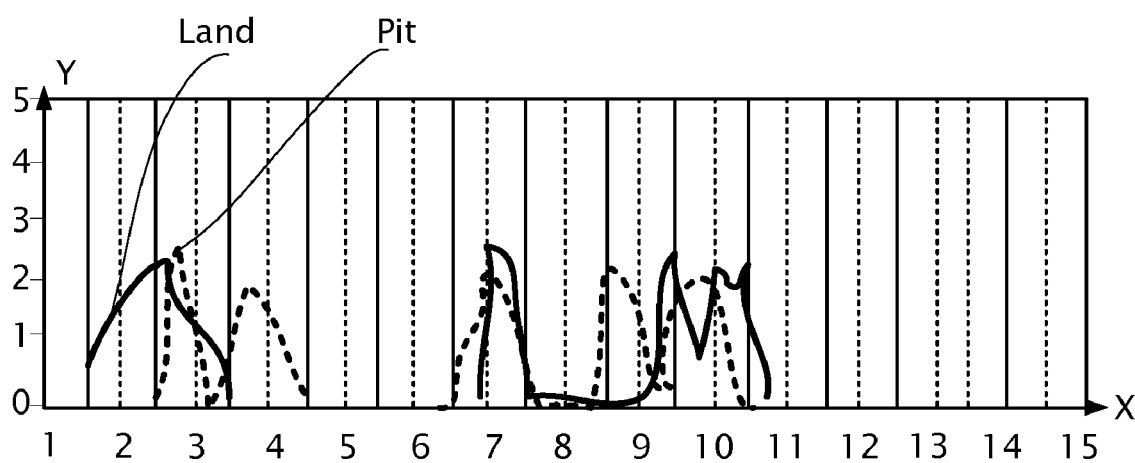
FIG. 7 is a graph illustrating a distribution of pits and lands.

Referring to FIG. 7, a distribution of pits and lands after the test data are recorded on the disc 200 is illustrated. The X-axis represents mark lengths of the pits and the lands, and the Y-axis represents the amount of the pits and the lands of respective mark lengths. Although the test data do not include 4T or 5T mark or space periods, parts of the 3T pits and lands are diffused into 2T and 4T pits and lands because the recording signal 530 is not optimized. A parameter PS (pulse sigma) is defined to describe a concentricity of the 3T pits and lands. The PS detecting unit 440 is used for detecting the parameter PS of the test data recorded onto the disc 200. The parameter PS is a sum of a standard deviation of mark lengths of the pits and a standard deviation of mark lengths of the lands. The parameter PS is calculated via following formula:

$$PS = \sqrt{\sum_{i=1}^{n}(T_{i,P} - \overline{T}_P)^2/n} + \sqrt{\sum_{j=1}^{m}(T_{j,L} - \overline{T}_L)^2/m}$$

wherein, $0.5T \leq T_{i,P}, T_{j,L} \leq 5.5T$ wherein, $T_{i,P}$ and $T_{j,L}$ represent the mark lengths of the pits and the lands respectively; $T_P$ and $T_L$ represent average mark lengths of the pits and the lands respectively; and n and m represent a number of the pits and a number of the lands respectively.

Figure 8:
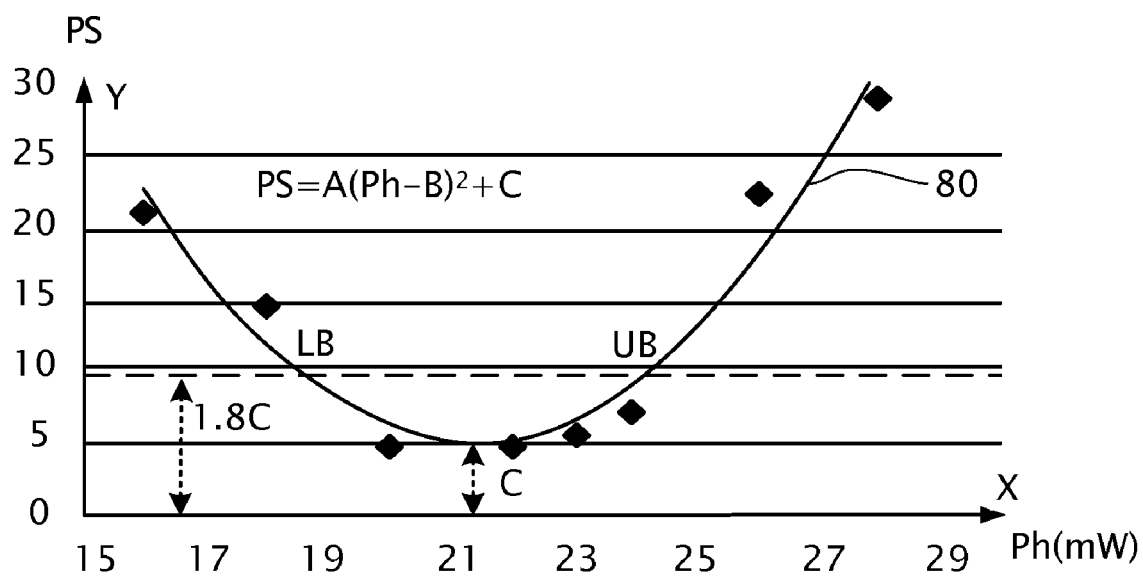
FIG. 8 is a graph illustrating a quadratic curve fitted to PS values and the first test power values.

Therefore, eight PS values PS1~PS8 are obtained corresponding to the eight different first test power values Ph1~Ph8. The quadratic curve fitting unit 450 is used for fitting a quadratic curve through the PS values and the first test power values. Referring to FIG. 8, a quadratic curve 80 is fitted to these eight data points. The X-axis represents the first power values of Ph, and the Y-axis represents PS values. The quadratic curve 80 is defined by the following quadratic curve fitting equation:

$PS=A(Ph-B)^2+C$.

Constants A, B, and C can be calculated according to the eight PS values PS1~PS8 and the eight different first power values Ph1~Ph8. Thus a first minimum PS value is equal to the constant C, therefore, Ph is equal to the constant B for obtaining the first minimum PS value.

The pits and lands are not only affected by the first power value Ph, but also affected by the rising edge of the top pulse 532 because the rising edge of the top pulse 532 determines the starting edge of the pit. If the rising edge of the top pulse 532 is not properly adjusted, the length of the pit may be incorrect. Thus adjustment of the segment is desired to adjust the rising edge of the top pulse 532. In order to get a smaller PS value, the segment and Ph are adjusted.

The power value calculator 430 calculates a maximum power value UB and a minimum power value LB of the first power value Ph. The maximum power value UB and the minimum power value LB is determined by the following equations:

$LB=-\sqrt{0.8C/A}+B$ $A(Ph-B)^2+C=1.8 C$  $UB=+\sqrt{0.8C/A}+B$  (4)

wherein the PS value is set to a largest acceptable value 1.8 C to obtain the maximum power value UB and the minimum power value LB of the first power value Ph.

Figure 9:
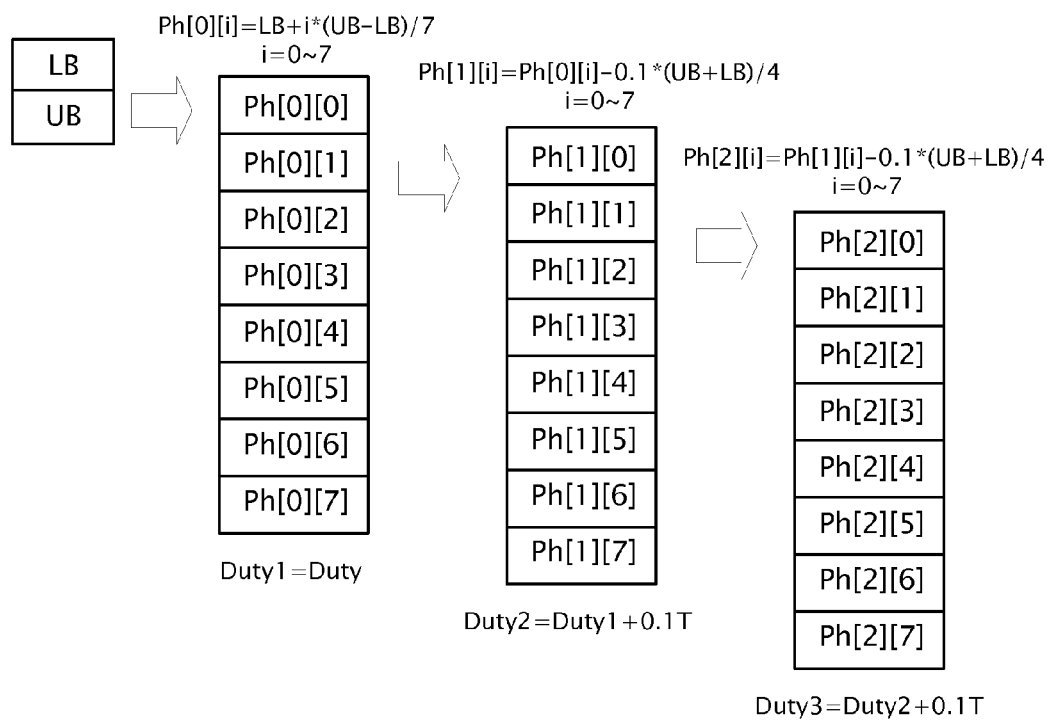
FIG. 9 is schematic diagram illustrating three groups of power values and duties.

Referring to FIG. 9, according to the above calculated maximum power value UB and minimum power value LB, three groups of power values Ph are calculated by the power value calculator 430 from the following equations:

First group: $Ph[0][i]=LB+i*(UB-LB)/7$  $i=0\sim7$

Second group: $Ph[1][i]=Ph[0][i]-0.1*(UB+LB)/4$
$i=0\sim7$

Third group: $Ph[2][i]=Ph[1][i]-0.1*(UB+LB)/4$
$i=0\sim7$

The segment calculator 460 is used for calculating three groups of segment values corresponding to the three groups of the power values Ph. A first segment value Segment1 corresponding to the first group is equal to the initial segment value, for example, 3.1T according to FIG. 5. A second segment value Segment2 corresponding to the second group is equal to the first segment value Segment1 plus a segment variation, for example, Segment1+0.1T. A third segment value Segment3 corresponding to the third group is equal to the second segment value Segment2 plus the segment variation, that is, Segment2+0.1T. The three groups of the power values Ph and the three segment values corresponding to the three groups of the power values Ph are used to record the test data onto the disc 200 respectively.

Figure 10:
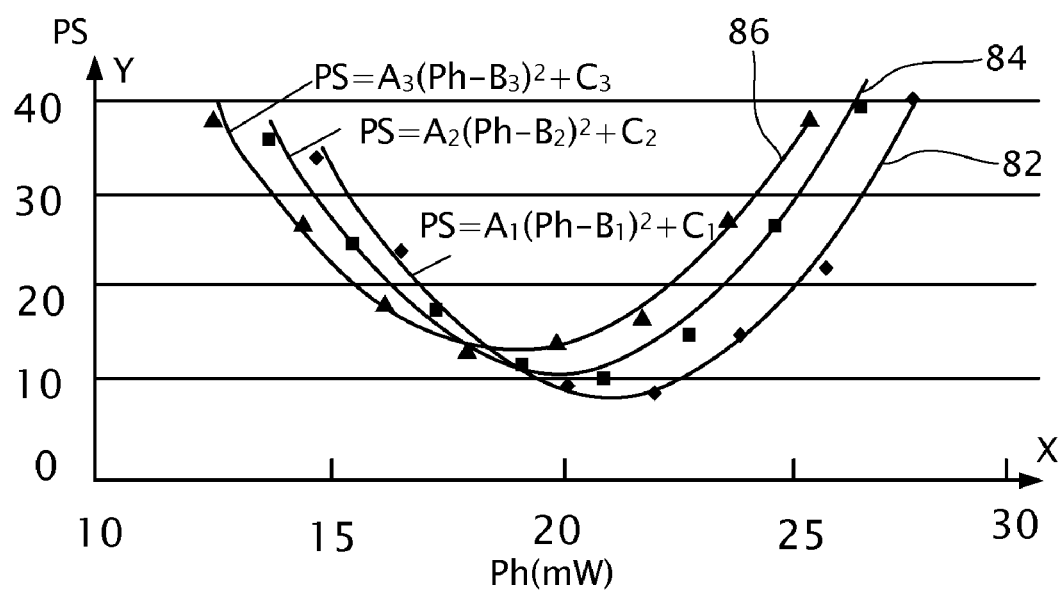
FIG. 10 is a graph illustrating three quadratic curves fitted to the three groups of power values and PS values.

Referring also to FIG. 10, three quadratic curves 82, 84, and 86 are obtained according to the test data recorded based on the three groups of the first power values Ph and the three segment values. Similarly, the quadratic curves 82, 84, and 86 are defined by the following quadratic curve fitting equation respectively:

$PS=A1*(Ph-B1)^2+C1;$ $PS=A2*(Ph-B2)^2+C2;$ $PS=A3*(Ph-B3)^2+C3.$

Accordingly, constants C1, C2, and C3 can be calculated by the quadratic curve fitting unit 450. Thus a second minimum PS value is selected from the minimum value of C1, C2, and C3, and an optimum first power value Ph is selected from B1, B2, and B3 corresponding to the minimum value of C1, C2, and C3. That is, the optimum first power value Ph is determined. Therefore, an optimum segment value is selected from the first segment value Segment1, the second segment value Segment2, and the third segment value Segment3 corresponding to the PS value. The optimum first power value Ph and the optimum segment value are stored in the optimum parameter unit 426.

Figure 11:
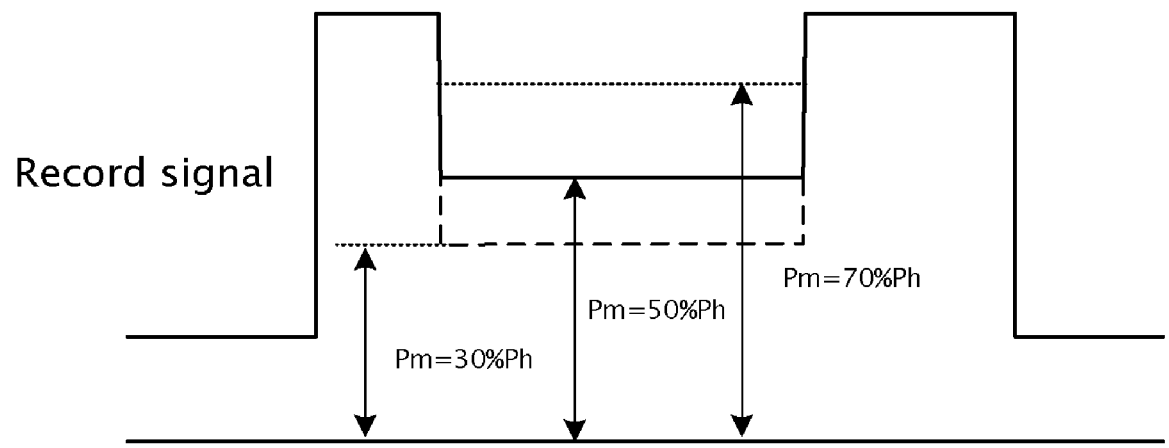
FIG. 11 is a schematic diagram illustrating adjustment of three values of a second power value Pm.

Referring to FIG. 11, the power value calculator 430 calculates three values of the second power value Pm based on the optimum first power value Ph, for example, Pm1=0.3 Ph, Pm2=0.5 Ph, and Pm3=0.7 Ph. That is, calculates the values of Pm/Ph. In order to evaluate the second power value Pm, a non-balance (NB) parameter is defined to determine the second power value Pm. The NB detect unit 470 is used for detecting the NB parameter. The NB parameter is calculated by the following equation:

$$NB = \sum_{i=1}^{n} T_{i,P}/n - \sum_{j=1}^{m} T_{j,L}/m \quad (5)$$

-continued
wherein, $0.5T \le T_{i,P}, T_{j,L} \le 5.5T$ wherein, the $T_{i,P}$ and $T_{j,L}$ represent the mark lengths of the pits and lands respectively; n and m represent the number of the pits and lands respectively. That is, the NB parameter is a difference of an average length of the pits and an average length of the lands.

Figure 12:
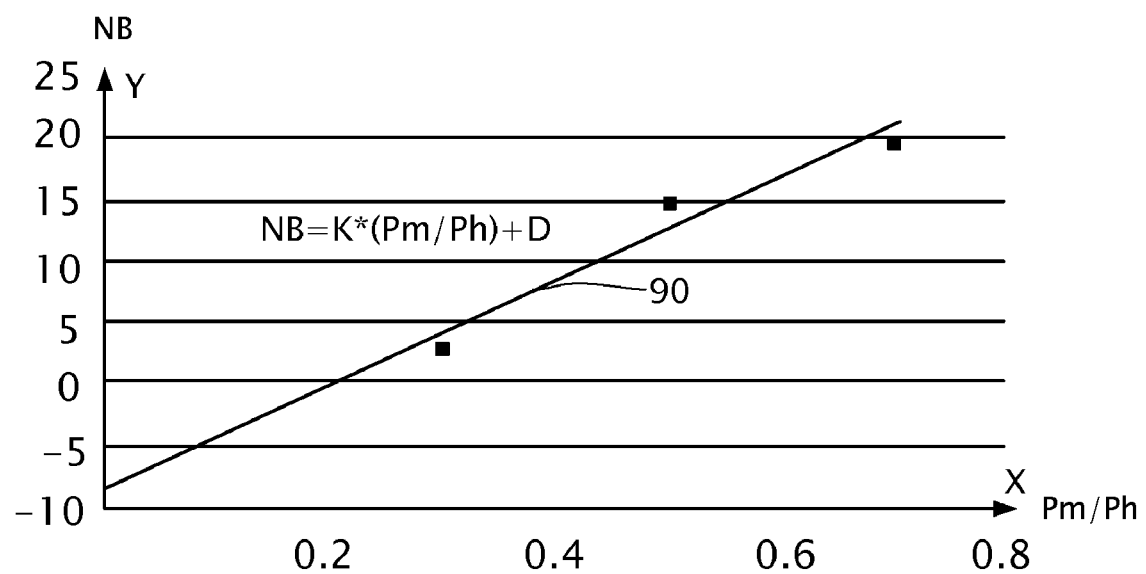
FIG. 12 is a graph illustrating a linear graph fitted to three NB parameters and values of Pm/Ph.

Referring to FIG. 12, there are three points illustrating relations of three NB parameters and values of Pm/Ph. The abscissa, or Y-axis, represents the NB parameters, and the ordinate, or X-axis, represents values of Pm/Ph. A linear graph 90 is fitted to the three points. The linear curve fitting unit 480 is used for linear curve fitting the three NB parameters and the values of Pm/Ph. The linear graph 90 is defined by the following linear curve fitting equation:

$NB=K*(Pm/Ph)+D.$

Constants K and D can be calculated according to the NB parameters and the values of Pm/Ph. Thus a minimum NB parameter value can be derived when the value of Pm/Ph equals to −D/K, that is, the minimum NB parameter value is zero. Therefore, an optimum second power value Pm is determined due to the first power value Ph is calculated above. The optimum second power value Pm is stored in the optimum parameter unit 426 as well.

Figure 13:
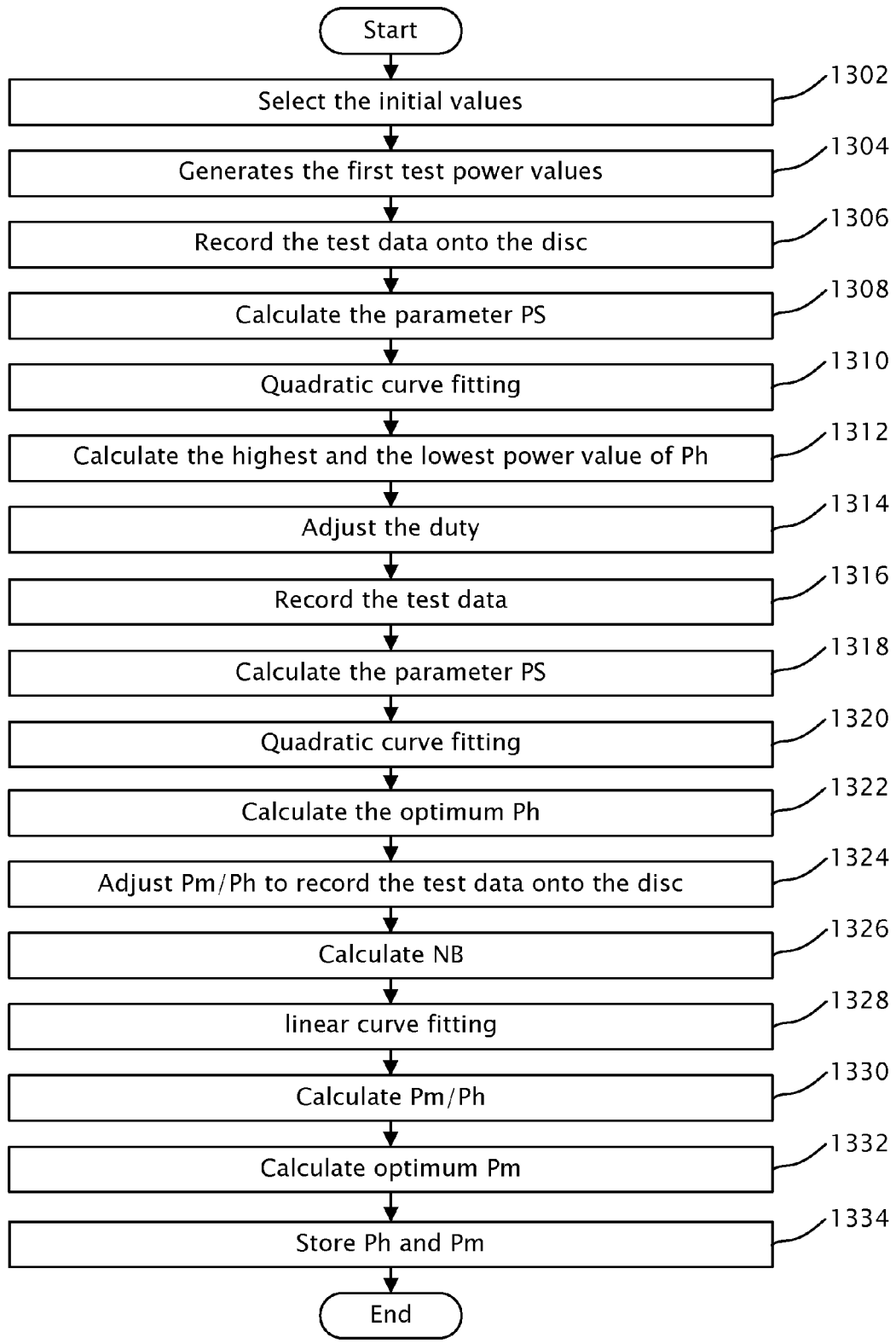
FIG. 13 is the procedure of a method for determining the recording signal of the recorder of FIG. 1.

Referring to FIG. 13, a procedure of a method for determining the recording signal of the recorder 100 is illustrated.

In step 1302, the recorder 100 selects the initial values stored in the initial parameter unit 422. The initial values are different according to different recording speeds and different recorders.

In step 1304, the recorder 100 generates the first test power values Ph1~Ph8 based on the initial power value of Ph stored in the initial parameter unit 422.

In step 1306, the recorder 100 records the test data onto the disc 200 employing the first test power values Ph1~Ph8, the segment, and the eight second different power values Pm1~Pm8 calculated based on the initial value of Pm/Ph stored in the initial parameter unit.

In step 1308, the PS detecting unit 440 detects the test data recorded on the disc 200 to calculate the parameter PS.

In step 1310, the quadratic curve fitting unit 450 quadratic curve fits the parameter PS and first test power values Ph1~Ph8 to calculate the constants A, B, and C. Therefore, the first minimum PS value and the first power value Ph for obtaining the first minimum PS of the first power value Ph is calculated.

In step 1312, the power value calculator 430 calculates the maximum power value UB and the minimum power value LB of the first power value Ph. The three groups of the power values are calculated based on the maximum power value UB and the minimum power value LB.

In step 1314, the segment calculator 460 calculates the three groups of the segment values corresponding to the three groups of the power values.

In step 1316, the recorder 100 records the test data onto the disc 200 based on the three groups of the power values and the three groups of the segment values.

In step 1318, the PS detecting unit 440 detects the test data recorded on the disc 200 in step 1316 to calculate the parameter PS.

In step 1320, the quadratic curve fitting unit 450 quadratic curve fits the parameter PS calculated in step 1318 and the first power values Ph to calculate the constants A1, A2, A3, B1, B2, B3, C1, C2, and C3.

In step 1322, the second minimum PS value and the optimum first power value Ph for obtaining the second minimum PS is calculated.

In step 1324, the value of Pm/Ph is adjusted to record the test data onto the disc 200. For example, Pm1=0.3 Ph, Pm2=0.5 Pn, and Pm3=0.7 Ph.

In step 1326, the NB detect unit detects the NB parameter of the test data recorded in step 1324.

In step 1328, the linear curve fitting unit 480 linear curve fits the NB parameter and the value of Pm/Ph.

In step 1330, the value of Pm/Ph is calculated to make the NB parameter equals to zero.

In step 1332, the optimum second power value Pm is calculated based on the optimum first power value Ph and the value of Pm/Ph calculated in step 1330.

In step 1334, the optimum first power value Ph, the optimum segment value corresponding to the optimum first power value Ph, and the value of Pm/Ph calculated in step 1330 are stored in the optimum parameter unit.

The optimum first power value Ph, the optimum segment value corresponding to the optimum first power value Ph, and the value of Pm/Ph are calculated based on the test data recorded onto the disc 200. Therefore, the recording signal is determined according to different discs and qualities of recording the discs are improved.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A method for determining a recording signal of a recorder to record data onto a disc, the recording signal comprising a top pulse having a first power value Ph, the method comprising:
    selecting an initial first power value of the top pulse stored in the recorder;
    generating first test power values based on the initial first power value to record test data onto the disc;
    detecting concentricity parameters PS corresponding to the first test power values, the concentricity parameters PS being used for describing a concentricity of pits and lands;
    quadratic curve fitting the concentricity parameters PS and the first test power values employing the following quadratic curve fitting equation: $PS=A(Ph-B)^2+C$ to obtain the constants A, B, and C;
    determining an optimum value of the first power value Ph, this optimum value equals to B; and
    storing the optimum value to be used for recording the data onto the disc.

2. The method as claimed in claim 1, wherein the first test power values are generated linearly based on the initial first power value.

3. The method as claimed in claim 1, wherein the recording signal comprises a middle pulse having a second power value Pm.

4. The method as claimed in claim 3, further comprising:
    calculating values of the Pm/Ph to record the test data onto the disc;
    detecting a non-balance (NB) parameter corresponding to the values of the Pm/Ph, the NB parameters being used for describing a difference of an average length of the pits and an average length of the lands;
    linear curve fitting the NB parameters and the values of the Pm/Ph employing the following linear curve fitting equation: $NB=K*(Pm/Ph)+D$ to obtain the constants K and D;
    determining an optimum value of Pm/Ph, the optimum value of Pm/Ph equals to $-D/K$; and
    storing the optimum value of Pm/Ph for recording the data onto the disc.

5. The method as claimed in claim 4, further comprising:
    calculating the second power value Pm based on the optimum value of the first power value Ph and Pm/Ph.

6. The method as claimed in claim 5, further comprising:
    recording the data onto the disc employing the first power value Ph and the second power value Pm.

7. The method as claimed in claim 1, further comprising:
    setting a largest acceptable value of the concentricity parameter PS;
    calculating a maximum power value UB and a minimum power value LB of the first power value Ph based on the largest acceptable value of the concentricity parameter PS;
    adjusting a segment of the recording signal, the segment being used for adjusting a rising edge of the top pulse; and
    recording the test data onto the disc employing the first power value Ph having a plurality of power values between the maximum power value UB and the minimum power value LB and the adjusted segment.

8. The method as claimed in claim 7, wherein the largest acceptable value of the concentricity parameter PS is equal to 1.8 C.

9. The method as claimed in claim 8, wherein the minimum power value LB equals to $-\sqrt{0.8C/A}+B$, and the maximum power value UB equals to $\sqrt{0.8C/A}+B$.

10. The method as claimed in claim 9, wherein the plurality of power values the first power value Ph comprising three groups, and the adjusted segment comprising three groups corresponding to the three groups of power values.

11. The method as claimed in claim 10, wherein the three groups of power values of the first power value Ph are:

first group: $Ph[0][i]=LB+i*(UB-LB)/7$ $i=0\sim7$;

second group: $Ph[1][i]=Ph[0][i]-0.1*(UB+LB)/4$ $i=0\sim7$;

third group: $Ph[2][i]=Ph[1][i]-0.1*(UB+LB)/4$ $i=0\sim7$.

12. The method as claimed in claim 11, wherein the three groups of the segment are:
    a first segment value D1 corresponding to the first group is equal to the initial segment value;
    a second segment value D2 corresponding to the second group is equal to the first segment value D1 plus a segment variation; and
    a third segment value D3 corresponding to the third group is equal to the second segment value D2 plus the segment variation.

13. The method as claimed in claim 12, further comprising:
    detecting concentricity parameters PS of the test data recorded by the first power value Ph having the plurality of power values between the maximum power value UB and the minimum power value LB and the adjusted segment; and quadratic curve fitting the concentricity parameters PS and the first test power values.

14. The method as claimed in claim 1, wherein the concentricity parameter PS is calculated via following formula:

$$PS = \sqrt{\sum_{i=1}^{n}(T_{i,P} - \overline{T}_P)^2/n} + \sqrt{\sum_{j=1}^{m}(T_{j,L} - \overline{T}_L)^2/m}$$

wherein, $0.5T \leq T_{i,P}, T_{j,L} \leq 5.5T$ wherein, $T_{i,P}$ and $T_{j,L}$ represent mark lengths of the pits and lands respectively; $\overline{T}_P$ and $\overline{T}_L$ represent average mark lengths of the pits and lands respectively; and n and m represent a number of the pits and lands respectively.

15. A recorder, comprising:
an optical pickup unit for emitting a laser beam to be focused on a disc to record data onto the disc;
a controlling device for adjusting a recording signal for controlling the laser beam, the controlling device comprising:
a pulse generator for generating the recording signal;
a storage module for storing power values and test data;
a PS detect unit for detecting concentricity parameters PS of the test data, the concentricity parameters PS being used for describing a concentricity of pits and lands;
a quadratic curve fitting unit for quadratic curve fitting the concentricity parameters PS and the first test power values Ph employing the following quadratic curve fitting equation: PS=A(Ph−B)²+C to obtain the constants A, B, and C; and
a power value calculator for calculating an optimum value of the first power value Ph, this optimum value equals to B.

16. The recorder as claimed in claim 15, wherein the concentricity parameter PS is calculated via following formula:

$$PS = \sqrt{\sum_{i=1}^{n}(T_{i,P} - \overline{T}_P)^2/n} + \sqrt{\sum_{j=1}^{m}(T_{j,L} - \overline{T}_L)^2/m}$$

wherein, $0.5T \leq T_{i,P}, T_{j,L} \leq 5.5T$ wherein, $T_{i,P}$ and $T_{j,L}$ represent mark lengths of the pits and lands respectively; $\overline{T}_P$ and $\overline{T}_L$ represent average mark lengths of the pits and lands respectively; and n and m represent a number of the pits and lands respectively.

17. The recorder as claimed in claim 15, wherein the storage module comprises an optimum parameter unit for storing the optimum value of the first power value Ph.

18. The recorder as claimed in claim 15, wherein the controlling device further comprises a non-balance (NB) detecting unit for detecting a NB parameter, the NB parameters being used for describing a difference of an average length of the pits and an average length of the lands.

19. The recorder as claimed in claim 18, wherein the controlling device further comprises a segment calculator for adjusting a segment of the recording signal, the segment being used for adjusting a rising edge of the top pulse.

20. The recorder as claimed in claim 18, wherein the controlling device further comprises a linear curve fitting unit for linear curve fitting the NB parameters and the values of the Pm/Ph employing the following linear curve fitting equation:

NB=K*(Pm/Ph)+D to obtain the constants K and D.

* * * * *